US010829417B2

(12) United States Patent
Uibel et al.

(10) Patent No.: US 10,829,417 B2
(45) Date of Patent: Nov. 10, 2020

(54) FORMED HEXAGONAL BORON NITRIDE BODY, HEXAGONAL BORON NITRIDE GRANULATES FOR MAKING THE SAME, AND PROCESS FOR PRODUCING THE SAME

(71) Applicant: 3M INNOVATIVE PROPERTIES COMPANY, St. Paul, MN (US)

(72) Inventors: Krishna B. Uibel, Waltenhofen (DE); Jan C. Zimmer, Kempten (DE); Christoph Lesniak, Buchenberg (DE); Robert M. Schädel, Neuss (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 25 days.

(21) Appl. No.: 16/310,230

(22) PCT Filed: Jun. 15, 2017

(86) PCT No.: PCT/US2017/037602
§ 371 (c)(1),
(2) Date: Dec. 14, 2018

(87) PCT Pub. No.: WO2017/218730
PCT Pub. Date: Dec. 21, 2017

(65) Prior Publication Data
US 2019/0177234 A1    Jun. 13, 2019

(30) Foreign Application Priority Data
Jun. 16, 2016    (EP) .................................... 16174825

(51) Int. Cl.
*C04B 35/5833* (2006.01)
*C04B 35/626* (2006.01)
(Continued)

(52) U.S. Cl.
CPC .......... *C04B 35/583* (2013.01); *C01B 21/064* (2013.01); *C01B 21/0648* (2013.01);
(Continued)

(58) Field of Classification Search
CPC .................................................... C04B 35/583
See application file for complete search history.

(56) References Cited

U.S. PATENT DOCUMENTS 4,960,734 A    10/1990    Kanai
5,898,009 A    4/1999    Shaffer
(Continued)

FOREIGN PATENT DOCUMENTS

DE    102008062155    12/2008
DE    102014222365    5/2016
(Continued)

OTHER PUBLICATIONS

1507 Extended EP search report for EP16174825.6; PCT/US2017/037602 dated Oct. 18, 2016, 8 pages.
(Continued)

*Primary Examiner* — Karl E Group
(74) *Attorney, Agent, or Firm* — Thomas M. Spielbauer (57) ABSTRACT

Provided are formed bodies comprising hexagonal boron nitride wherein the formed body has a Brinell hardness of at least 2 HBW 2,5/2, and wherein the formed body is obtainable by a process at temperatures of at most 100° C., and wherein the Brinell hardness is measured according to DIN EN ISO 6506-1 (2013). Further provided are processes for making said formed body.

15 Claims, 1 Drawing Sheet

1μm (51) Int. Cl.
*C04B 35/583* (2006.01)
*C01B 21/064* (2006.01)

(52) U.S. Cl.
CPC .... *C04B 35/62695* (2013.01); *C01P 2002/72* (2013.01); *C01P 2004/03* (2013.01); *C01P 2004/50* (2013.01); *C01P 2004/61* (2013.01); *C01P 2004/62* (2013.01); *C01P 2006/10* (2013.01); *C01P 2006/12* (2013.01); *C04B 2235/3409* (2013.01); *C04B 2235/386* (2013.01); *C04B 2235/5292* (2013.01); *C04B 2235/5296* (2013.01); *C04B 2235/5409* (2013.01); *C04B 2235/5472* (2013.01); *C04B 2235/608* (2013.01); *C04B 2235/61* (2013.01); *C04B 2235/72* (2013.01); *C04B 2235/767* (2013.01); *C04B 2235/77* (2013.01); *C04B 2235/96* (2013.01)

(56) References Cited

U.S. PATENT DOCUMENTS

| | | | |
|---|---|---|---|
| 6,299,805 B1 | 10/2001 | Friese | |
| 6,764,975 B1* | 7/2004 | Clere | C01B 21/0648 423/290 |
| 2005/0288168 A1* | 12/2005 | Krolikowski | B22D 11/0648 501/96.4 |
| 2015/0137026 A1* | 5/2015 | Engler | C01B 21/064 252/75 |
| 2015/0147520 A1* | 5/2015 | Grau | C04B 35/583 428/118 |

FOREIGN PATENT DOCUMENTS

| | | |
|---|---|---|
| EP | 0939066 | 9/1999 |
| WO | WO 2009-030331 | 3/2009 |
| WO | WO 2009-030411 | 3/2009 |

OTHER PUBLICATIONS

International Search report for PCT International Application No. PCT/US2017/037602 dated Aug. 10, 2017, 5 pages.

\* cited by examiner

FORMED HEXAGONAL BORON NITRIDE BODY, HEXAGONAL BORON NITRIDE GRANULATES FOR MAKING THE SAME, AND PROCESS FOR PRODUCING THE SAME

CROSS REFERENCE TO RELATED APPLICATIONS

This application is a national stage filing under 35 U.S.C. 371 of PCT/US2017/037602, filed Jun. 15, 2017, which claims the benefit of European Application No. 16174825.6, filed Jun. 16, 2016, the disclosure of which is incorporated by reference in their entirety herein.

TECHNICAL FIELD

The present invention relates to a formed hexagonal boron nitride body with a good mechanical stability, to a hexagonal boron nitride granulate for making such a formed hexagonal boron nitride body, and to processes for making such a formed hexagonal boron nitride body and such a hexagonal boron nitride granulate.

BACKGROUND

Hexagonal boron nitride has a high temperature stability, is electrically insulating, is a solid lubricant and has a high thermal conductivity. Furthermore hexagonal boron nitride is used as raw material for the production of cubic boron nitride, it can be used for cosmetic purposes and as a release agent for metallurgical applications, and for further applications for example in the field of metallurgy. It is densified by hot-pressing in order to obtain sufficient mechanical stability and optionally sufficient density of formed bodies. The hot-pressed formed bodies are usually machined mechanically to the final shape.

Hexagonal boron nitride powder is technical synthesized by nitridation of boric acid in the presence of a nitrogen source. As a nitrogen source, ammonia can be used, and then usually calcium phosphate is used as a carrier material for the boric acid. An organic nitrogen source such as melamine and urea can also be used and can be reacted with boric acid or borates under nitrogen. The nitridation usually is carried out at a temperature of from 800° C. to 1200° C. The thereby obtained boron nitride is substantially amorphous, it is also known as turbostratic boron nitride. The amorphous boron nitride is transformed at higher temperatures of up to about 2100° C., preferably in a nitrogen atmosphere, into hexagonal, crystalline boron nitride. Often for this high temperature treatment crystallization additives are added to the amorphous boron nitride.

In the high temperature treatment, hexagonal boron nitride (hBN) is produced in the form of primary particles having a platelet shaped morphology. Typical sizes of the boron nitride platelets are in the range of 1 to 20 μm, but platelet sizes of up to 50 μm are also possible. Usually the hexagonal boron nitride is crushed or de-agglomerated after the high temperature treatment, in order to obtain powders that can be further processed for various applications. In further steps impurities can be removed selectively to obtain high purity hexagonal boron nitride.

To obtain mechanically strong bodies, hexagonal boron nitride powder is filled in molds and hot-pressed and thereby densified at high temperatures. Often the hexagonal boron nitride powder is granulated before it is hot-pressed, in order to increase the bulk density and to allow higher fillings of the molds, as non-granulated hexagonal boron nitride powders have usually low bulk densities of about 0.1 to 0.5 g/cm$^3$. The so produced hot-pressed bodies have a sufficient mechanical stability for producing solid shapes, which is usually done by mechanical machining.

Hot-pressing of boron nitride is a cost-intensive process, as for hot-pressing a special equipment is required where high temperatures of above 1800° C. and up to about 2200° C. and high uniaxial pressures of about 20 MPa can be applied in a protective gas atmosphere.

EP 0 939 066 A1 discloses a method to form pellets or agglomerates of high density boron nitride made of high-purity hexagonal boron nitride powder, with the operations of cold pressing and granulation repeated until the density of the pellets or agglomerates is above 1.86 g/cm$^3$. The obtained pellets are intended to be used for converting hexagonal boron nitride into cubic boron nitride and are mechanically weak.

DE 19 750 107 C1 discloses a boron nitride sealing body that is produced by using machined hot-pressed hexagonal boron nitride to which a binder has been added for dry-pressing.

DE 10 2014 222 365 A1 discloses a method of manufacturing a seal for a sensor element, comprising the following steps: providing a ceramic material having at least boron nitride and boron trioxide with a proportion of boron trioxide with respect to the ceramic material of 2.0 wt.-% to 6.0 wt.-%, forming the ceramic material by pressing to a gasket, and thermal treatment of the seal at temperatures of 475 to 1250° C. The boron nitride material which is used for the disclosed method can be obtained, for example, by milling or machining of hot-pressed sintered parts.

There is a need for hexagonal boron nitride formed bodies that are mechanically stable and that can be produced by a cost-efficient process without the need of hot-pressing.

SUMMARY

This need is met by the hexagonal boron nitride formed body having the features of claim 1, the hexagonal boron nitride granulated powder having the features of claim 9 for making such a formed body, the process for making such a formed body having the features of claim 13, and the process for making such a granulated powder having the features of claim 10, and the use of the formed body having the features of claim 15. Preferred and particularly expedient embodiments are specified in the dependent claims 2-8, 11-12 and 14.

The subject-matter of the invention is consequently a formed body comprising hexagonal boron nitride, wherein the formed body has a Brinell hardness of at least 2 HBW 2,5/2, measured according to DIN EN ISO 6506-1 (2013), and wherein the formed body is obtainable by a process at temperatures of at most 100° C.

The subject-matter of the invention is also a granulated powder comprising hexagonal boron nitride wherein the granulated powder has a bulk density of at least 0.5 g/cm$^3$, a specific surface area (BET) of at least 12 m$^2$/g and a specific surface area (BET) of at least 15 m$^2$/g after a washing step, wherein the washing step is carried out at a temperature of 70-100° C. with hydrochloric acid. The granulated powder is useful for making the formed body according to the invention.

The subject-matter of the invention is also a process for making the granulated powder of claim 9, wherein the process comprises the steps (a) providing a powder comprising hexagonal boron nitride powder; and
(b) mechanically pre-treating the powder of step (a) to obtain a pre-treated powder; and
(c) granulating the pre-treated powder of step (b) in order to obtain a granulated powder;
and wherein all process steps for making the granulated powder are carried out at temperatures of at most 100° C.

The subject-matter of the invention is also a process for making the formed body of claim 1, wherein the process comprises the steps
(a) providing a powder comprising hexagonal boron nitride powder;
(b) mechanically pre-treating the powder of step (a) to obtain a pre-treated powder;
(c) optionally granulating the pre-treated powder of step (b) in order to obtain a granulated powder; and
(d) forming the pre-treated powder of step (b) or the granulated powder of step (c) into a shape in order to obtain a formed body;
and wherein all process steps for making the formed body are carried out at temperatures of at most 100° C.

The formed body according to the invention is mechanically stable. It has a high degree of contour accuracy and high edge stability. The formed body being mechanically stable can be produced without the need of a cost-intensive high-temperature hot-pressing process.

BRIEF DESCRIPTION OF THE DRAWINGS

The invention is explained in more detail on the basis of the drawings, in which.

DETAILED DESCRIPTION

The formed body according to the invention comprises hexagonal boron nitride. The formed body may contain other ingredients than hexagonal boron nitride, such as inorganic additives in form of ceramic powders with a typical particle size ($d_{50}$) of 0.5 to 10 µm, depending on the intended use of the formed body. The formed body has a boron nitride content of at least 70% by volume, preferably at least 80% by volume, based on the total volume of the formed body. In some embodiments, the formed body has a boron nitride content of at least 90% by volume, based on the total volume of the formed body. In some other embodiments, the formed body has a boron nitride content of at least 95% by volume, based on the total volume of the formed body.

The relative density of the formed body is preferably at least 50% of the theoretical density of the formed body. More preferably, the relative density of the formed body is at least 60%, more preferably at least 70% of the theoretical density of the formed body. Typically, the relative density of the formed body can be 99% or less, or 95% or less, or 90% or less, of the theoretical density of the formed body. The theoretical density of hexagonal boron nitride formed bodies is the powder density of the pure hexagonal boron nitride powder which is 2.25 g/cm³. If other ingredients than hexagonal boron nitride are present in the formed body, the theoretical density is calculated by the theoretical densities of the components and their respective fractions in the composition of the formed body.

The density of the formed body is at least 1.3 g/cm³, preferably at least 1.6 g/cm³. In some embodiments, the density of the formed body is at least 1.8 g/cm³.

The formed body is mechanically stable and has good mechanical properties. Thus the formed body is stable for transportation. The compressive strength of the formed body preferably is at least 3 N/mm². More preferably, the compressive strength of the formed body is at least 5 N/mm², more preferably at least 7 N/mm², more preferably at least 10 N/mm², most preferably at least 12 N/mm². In some embodiments, the compressive strength of the formed body is at least 15 N/mm² or 20 N/mm². The compressive strength is measured as maximum force before rupture of a test sample of the formed body, divided by the area of the test sample on which the load is applied. The compressive strength is measured in the pressure test. The pressure test is typically carried out with test samples having the dimensions 20×20×10 mm. The pressure test can be carried out in a universal testing machine, for example in a universal testing machine type 1474.100 from Zwick GmbH & Co. KG, Germany. The pressure test is carried out at room temperature (23° C.). The pressure test can be carried out according to DIN 51104 with the following differences: the samples are in direct contact with the pressure plates of the testing machine, the material of the testing plates is not a ceramic material but a cemented carbide, and the size of the samples is 20×20×10 mm.

The formed body has a high hardness. The hardness of the formed body can be measured by the Brinell method according to DIN EN ISO 6506-1 (2013). The Brinell hardness of the formed body is at least 2 HBW 2.5/2. The designation "HBW 2.5/2" means that the measurement has been carried out with a Brinell sphere of diameter 2.5 mm and with a load of 2 kp. Preferably, the Brinell hardness of the formed body is at least 3 HBW 2.5/2, more preferably at least 5 HBW 2.5/2. In some embodiments, the Brinell hardness of the formed body is at least 8 HBW 2.5/2. In some other embodiments, the Brinell hardness of the formed body is at least 12 HBW 2.5/2.

The formed body has a low median pore diameter. Preferably, the median pore diameter of the formed body is at most 130 nm, more preferably at most 100 nm, more preferably at most 75 nm. The median pore diameter can be measured by mercury porosimetry according to ISO 15901-1 (2005). By mercury porosimetry, the pores of a sample are filled with mercury under pressure. Mercury is forced to intrude pores, cracks or other defects open to a surface by external pressure. As a non-wetting liquid, mercury is bridging openings such as pores, cracks or other defects, which are open to a material surface, due to interfacial tension. When sufficient external pressure is applied, mercury forces entry through those openings. The necessary pressure is correlated with the diameter of the opening, e.g. at atmospheric/ambient pressure mercury will only enter pores which are not smaller than about 6 µm as open diameter. When the external pressure is as high as 414 MPa (60,000 psi) mercury will force its way into pores with a diameter down to about 3 nm. Each pressure in between atmospheric/ambient pressure and 414 MPa can be paired with a certain pore diameter, calculating it incremental either based on the volume or on the shell area of pores leading to a median pore diameter either by volume or by area. As used herein, the median pore diameter is the median pore diameter by volume. For the mercury porosimetry measurement, samples can be prepared from powders or granules or from formed bodies. The formed bodies can be formed by dry-pressing in a uniaxial press at a pressure of 1200 bar. The sample size of the formed bodies typically is 20×20×10 mm. The measurement itself is carried out according to ISO 15901-1 (2005). The mercury porosimetry measurement of the formed bodies according to the invention revealed multimodal pore-size distribution with very fine pores with diameters around 0.05 µm and less, down to 3 nm.

Additionally to hexagonal boron nitride, the formed body may contain other inorganic non-metallic components, as already described above. For example, the formed body may contain mineral or ceramic powders, such as oxide ceramics, for example aluminum oxide ($Al_2O_3$), silicon oxide ($SiO_2$), and magnesium oxide (MgO), carbide ceramics, for example silicon carbide (SiC), and nitride ceramics, for example silicon nitride ($Si_3N_4$) and aluminum nitride (AlN), and mixtures thereof. The formed body can contain carbon (C) in amorphous or crystalline (graphite) modification. The mean particle size ($d_{50}$) of the mineral, ceramic or graphite powders is from 0.5 to 10 µm. The powders may typically have an irregular shape. The mineral, ceramic or carbon material can also be in the shape of spheres, fibers or flakes. The formed body may also contain compounds of boron such as boric acid and ammonium borates.

The formed body is obtainable by a process which does not comprise a sintering step or thermal treatment at temperatures above 100° C., thus being obtainable by a process at temperatures of at most 100° C. Preferably, the formed body is obtainable by a process at a temperature from 10 to 40° C., more preferably at room temperature (23° C.).

The formed body according to the invention is obtainable by a process comprising the steps
(a) providing a powder comprising hexagonal boron nitride powder;
(b) mechanically pre-treating the powder of step (a) to obtain a pre-treated powder;
(c) optionally granulating the pre-treated powder of step (b) in order to obtain a granulated powder; and
(d) forming the pre-treated powder of step (b) or the granulated powder of step (c) into a shape in order to obtain a formed body.

All process steps for making the formed body are carried out at temperatures of at most 100° C. It is not necessary to perform a sintering step or a thermal treatment of the formed body after the forming step (d), and even without a sintering step or thermal treatment the formed body is mechanically stable and has good mechanical properties. When performing a thermal treatment at temperatures from above 100 to 500° C., the hardness and compressive strength of the formed body will not increase significantly which means that they will increase by less than 25%, and thus a thermal treatment at temperatures of above 100° C. is not required in order to have formed bodies being mechanically stable. A drying step may follow the forming step, at temperatures of typically up to 100° C.

In order to obtain the formed body according to the invention, a pre-treated powder or a granulated powder is formed into a shape. Preferably, a granulated powder is formed into a shape. The granulated powder which is suitable for making the formed body is obtainable by a process comprising the steps
(a) providing a powder comprising hexagonal boron nitride powder;
(b) mechanically pre-treating the powder of step (a) to obtain a pre-treated powder; and
(c) granulating the pre-treated powder of step (b) in order to obtain a granulated powder.

All process steps for making the granulated powder are carried out at temperatures of at most 100° C.

As a starting powder to be provided in step (a), commercially available hexagonal boron nitride powders may be used, preferably with a specific surface area (BET) of 1 to 15 $m^2/g$. Also powders with a higher or lower specific surface area may be used. The mean particle size ($d_{50}$) of the hexagonal boron nitride powder may be from 0.2 to 50 µm, preferably from 0.5 to 25 µm, more preferably from 1 to 20 µm, even more preferably from 1 to 15 µm. The mean particle size ($d_{50}$) can be measured by laser diffraction (wet measurement, Master Sizer 2000, Malvern). Preferably, the total oxygen content of the hexagonal boron nitride powder is at most 10%, more preferably at most 8% and even more preferably at most 6%. In some embodiments, the total oxygen content of the hexagonal boron nitride powder is at most 5%, more preferably at most 4%, even more preferably at most 3%, even more preferably at most 2%, even more preferably at most 1%, even more preferably at most 0.5%, most preferably at most 0.1%. The oxygen content of the hexagonal boron nitride powder is partially related to oxygen bonded in the lattice of the boron nitride. An additional source of oxygen is related to soluble boron compounds such as boron oxide ($B_2O_3$), boric acid ($H_3BO_3$) and ammonium borates.

The graphitization index of the starting powder to be provided in step (a) preferably is at least 1, more preferably at least 1.5, more preferably at least 2, more preferably at least 2.5, and even more preferably at least 3. The graphitization index is measured by powder X-ray diffraction.

The starting powder to be provided in step (a) comprises less than 50% by volume, preferably less than 20% by volume, based on the total volume of the starting powder, of a powder that has been obtained by machining or milling of hot-pressed hexagonal boron nitride sintered parts. More preferably, the starting powder to be provided in step (a) does not comprise a powder that has been obtained by machining or milling of hot-pressed hexagonal boron nitride sintered parts. Therefore, the formed body comprises less than 50% by volume, preferably less than 20% by volume, more preferably 0% by volume, based on the total volume of the formed body, of a powder that has been obtained by machining or milling of hot-pressed hexagonal boron nitride sintered parts. The graphitization index of powders that have been obtained by machining or milling of hot-pressed hexagonal boron nitride sintered parts is typically below 2. Hexagonal boron nitride powders that have been obtained from hot-pressed hexagonal boron nitride sintered parts by machining or by milling often contain impurities and hard agglomerates and are not well-defined in particle size and particle size distribution. As already explained above, hot-pressing of hexagonal boron nitride is a cost-intensive process. In the process for making the formed body disclosed herein, it is not necessary to use a powder which has been produced by the cost-intensive process of hot-pressing and milling or machining.

The hexagonal boron nitride powder provided in step (a) is subjected to a pre-treatment in step (b). The pre-treatment comprises an energy input into the material, preferably a mechanical energy input. The input of mechanical energy may be done by vibrations or impacts or collisions. The mechanical pre-treatment may be a dry milling process, for example a dry ball milling process. For the dry milling process, any dry mill can be used, for example a ball mill, a dry agitated ball mill or a vibration mill. The atmosphere of the ball-milling process may be oxygen-containing or oxygen-free. By the pre-treatment, the mean particle size ($d_{50}$) of the hexagonal boron nitride powder may decrease, but it is also possible that the mean particle size remains unchanged or changes only slightly. The mean particle size is measured by laser diffraction (wet measurement, Mastersizer 2000, Malvern). The mean particle size ($d_{50}$) of the pre-treated hexagonal boron nitride powder may be from 0.2 to 50 µm, or from 0.5 to 25 µm, or from 1 to 20 µm, or from 3 to 20 µm.

Powder X-ray diffraction measurements of the pre-treated powder show the diffraction pattern of the hexagonal boron nitride crystal structure.

The specific surface area (BET) of the hexagonal boron powder undergoes an increase by the pre-treatment of step (b), by a factor of at least 1.5 times of the specific surface area (BET) of the starting material provided in step (a). Preferably, the factor of the increase of the specific surface area is at least 2, more preferably at least 5, most preferably at least 10. The specific surface area (BET) of the pre-treated powder obtained in step (b) is at least 12 $m^2/g$, preferably at least 15 $m^2/g$, more preferably at least 20 $m^2/g$, more preferably at least 25 $m^2/g$, more preferably at least 30 $m^2/g$, and even more preferably at least 40 $m^2/g$. In some embodiments, the specific surface area (BET) has values of at least 50 $m^2/g$, or of at least 60 $m^2/g$, or of at least 70 $m^2/g$. In other embodiments, the specific surface area (BET) has values of at least 75 $m^2/g$, or of at least 80 $m^2/g$, or of at least 90 $m^2/g$, or of at least 100 $m^2/g$, or of at least 110 $m^2/g$, or of at least 120 $m^2/g$.

In some embodiments, the increase of the specific surface area can be limited in time, and the increase can be followed by a decrease of the specific surface area. The decrease of the specific surface area can be only slightly, but it is also possible that the specific surface area decreases down to values of about 1.1 to 3.0 times of the starting values before the pre-treatment. This means that the increase in specific surface area may be only partially permanent. The decrease of the specific surface area is observed after several hours, days or months after the pre-treatment. The values of specific surface area after several hours, days or months after the pre-treatment are usually higher than the values of specific surface area of the starting material. In one embodiment, the specific surface area increases from values of 1-15 $m^2/g$ for the starting powder provided in step (a), to values of 20-140 $m^2/g$ for the pre-treated powder obtained in step (b). For example, for a hexagonal boron powder provided in step (a) with a specific surface area of 3 $m^2/g$, the specific surface area after the pre-treatment may have a value of 100 $m^2/g$. After storage of this pre-treated powder for 7 days, the specific surface area can decrease, for example to a value of 70-80 $m^2/g$ or even down to a value of 10 $m^2/g$.

The pre-treated powder obtained in step (b) may comprise water soluble boron compounds. The water soluble boron compounds are mainly oxygen containing boron compounds such as boric acid and ammonium borates. Examples of ammonium borates present in the pre-treated powder are ammonium pentaborate $(NH_4)B_5O_8$ or the hydrate thereof. Boric acid ($H_3BO_3$) and the ammonium pentaborate $(NH_4)B_5O_8$ can be detected by X-ray diffraction measurements. Preferably, the pre-treated powder does not contain boron oxide ($B_2O_3$) as boron oxide is preferably not added to the pre-treated powder, and it is not produced by the pre-treatment step. This is confirmed by X-ray measurements that do not show the diffraction lines of boron oxide.

The content of water soluble boron compounds can be expressed as content of boric acid in percentage by weight, based on the total weight of the sample, and can be determined according to the method described in the following.

The method described is following DIN 54387 Part 2 (2015). The sample is prepared for analysis by grinding it to a grain size below 150 µm, if necessary by using high purity grinding aids to prevent cross-contamination. About 1-6 g of the homogenized sample, depending on the expected amount of water soluble boron compounds, are stirred for 5 minutes into 250 ml deionized water along with 10 ml methanol using a 400 ml beaker and a magnetic stirrer. In the next step the beaker with the slurry is put into a water bath of 60° C. for 60 minutes. Then the slurry is removed from the water bath to cool down, and the pH value of the slurry is set to 3 using a few droplets of highly concentrated HCl. The slurry is titrated to pH 7 using 0.1 N NaOH. When a pH value of 7 is reached, 35 ml of 10% mannitol ($C_6H_{14}O_6$) solution is added. Now the pH value of the slurry is titrated up to 8, again by using 0.1 N NaOH. The consumption of NaOH to rise the pH value from 7 to 8 correlates with the amount of water-soluble boron compounds and can be expressed as content of boric acid in percentage by weight, based on the total weight of the sample.

The content of boric acid can be calculated with the formula $$\text{Content of } H_3BO_3 \text{ [wt.-\%]} = \frac{V_{NaOH} * F * 108.11 * 5.72}{m_{sample}}$$

wherein $V_{NaOH}$ is the consumption of 0.1 N NaOH, F is the titer of NaOH, and $m_{sample}$ is the weight of sample.

It can be observed that the content of water soluble boron compounds is increasing during the pre-treatment of step (b). After the pre-treatment, the content of water soluble boron compounds can increase further and remain at a higher level than before the pre-treatment. The increase of the content of water soluble boron compounds by the pre-treatment of step (b) can be as high as at least 1, 2, 5, 6 or 10% by weight, the content of water soluble boron compounds being expressed as content of boric acid in percentage by weight, based on the total weight of the pre-treated powder. The total content of water soluble boron compounds after the pre-treatment typically is up to 20% by weight, the content of water soluble boron compounds being expressed as content of boric acid in percentage by weight, based on the total weight of the pre-treated powder. In some embodiments, the total content of water soluble boron compounds after the pre-treatment is up to 10% by weight, or up to 6% by weight, the content of water soluble boron compounds being expressed as content of boric acid in percentage by weight, based on the total weight of the pre-treated powder. In some embodiments, the total content of water soluble boron compounds after the pre-treatment is at least 0.5% by weight, the content of water soluble boron compounds being expressed as content of boric acid in percentage by weight, based on the total weight of the pre-treated powder. In some embodiments, the total content of water soluble boron compounds can be from 0.5 to 10% or from 0.5 to 6% by weight, the content of water soluble boron compounds being expressed as content of boric acid in percentage by weight, based on the total weight of the pre-treated powder.

The water soluble boron compounds can be removed by a washing step. The washing step can be carried out with hydrochloric acid as described in the following. About 150 g of pre-treated hexagonal boron nitride powder is stirred into a beaker with 2 L deionized water at a temperature of 70-100° C. The beaker is placed on a heating plate to keep the temperature of 70-100° C. Hydrochloric acid (32%) is added to set the pH value to a value of about 1. The slurry is heated and stirred for 60 minutes. The slurry is then poured into a Buchner funnel for filtering and is rinsed with deionized water (70-100° C.) until the pH value of the filter cake rises to a neutral value of about 7. After that the filter cake is dried at about 60° C. in a drying furnace.

After the washing step, the pre-treated powder typically has a content of water soluble boron compounds of 0.5% or less, or of 0.3% or less by weight, based on the total weight of the pre-treated powder after the washing step. The specific surface area (BET) of the pre-treated powder obtained after the washing step is preferably at least 15 m$^2$/g, more preferably at least 20 m$^2$/g, more preferably at least 25 m$^2$/g, more preferably at least 30 m$^2$/g, and even more preferably at least 40 m$^2$/g. In some embodiments, the specific surface area (BET) has values of at least 50 m$^2$/g, or of at least 60 m$^2$/g, or of at least 70 m$^2$/g. In other embodiments, the specific surface area (BET) has values of at least 75 m$^2$/g, or of at least 80 m$^2$/g, or of at least 90 m$^2$/g, or of at least 100 m$^2$/g, or of at least 110 m$^2$/g, or of at least 120 m$^2$/g.

The graphitization index of the pre-treated powder obtained in step (b) preferably is at least 1, more preferably at least 1.5, more preferably at least 2, more preferably at least 2.5, more preferably at least 3, and even more preferably at least 4. The graphitization index can be increased by the pre-treatment, and the graphitization index of the pre-treated powder can have a value which is 0.2 plus the value of the starting powder or 0.5 plus the value of the starting powder or 1.0 plus the value of the starting powder. The graphitization index is measured by powder X-ray diffraction, preferably on samples obtained after the removal of the water soluble boron compounds by the washing step described above.

By the pre-treatment of step (b), small particles of a particle size far below 1 μm are formed. The formation of fines by the pre-treatment can be observed by scanning electron microscopy (SEM). The fines are sub-micron to nano-scale in size. Many of the fine particles have a particle size of 200 nm or less.

Figure 1A:
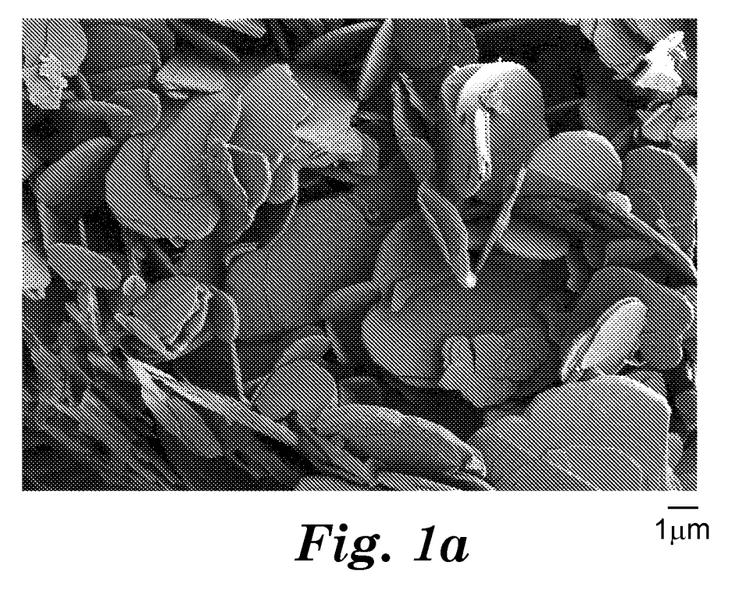
FIG. 1a shows a SEM picture of an example of a hexagonal boron nitride powder provided in step (a), before the pre-treatment.

FIG. 1a shows a SEM picture of an example of a hexagonal boron nitride (h-BN) powder provided in step (a), before the pre-treatment. The picture shows a commercially available h-BN powder (3M™ Boron Nitride Powder Grade S15) with an average particle size ($d_{50}$) of about 15 μm and a platelet shape of the particles. In the picture agglomerated particles with multiple layers with smooth-appearing surfaces and distinct outlines can be seen. Almost all particles have a platelet diameter of at least 1 μm, for most of the particles the platelet diameter is at least 3 μm.

Figure 1B:
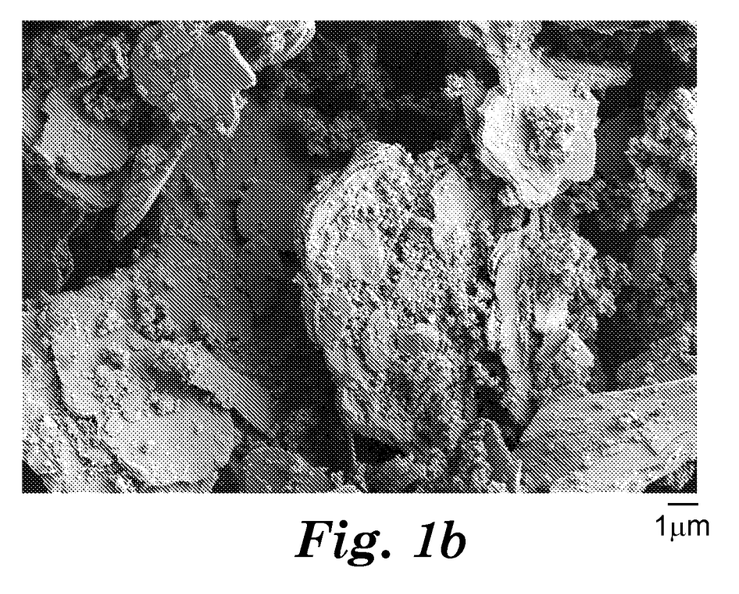
FIG. 1b shows a SEM picture of an example of a pre-treated powder obtained in step (b). The powder shown in FIG. 1b is the powder of FIG. 1a after the pre-treatment.

FIG. 1b shows a SEM picture of an example of a pre-treated powder obtained in step (b). The powder shown in FIG. 1b is the powder of FIG. 1a after the pre-treatment. The pre-treatment was carried out as described in Example 6 below. The edges of the h-BN platelets appear frayed and shattered. In the SEM picture, a bimodal particle size distribution can be observed. On the one hand there are particles of platelet shape with a diameter of at least 1 μm or of at least 3 μm, and on the other hand there are very fine particles and particle clusters with particle sizes far below 1 μm. Many of the fine particles have a particle size of 200 nm or less. The surfaces of the coarser particles of at least 1 μm or more appear roughened and more uneven.

The pre-treated powder obtained in step (b) can be either stored before further processing or processed directly after pre-treating. After the pre-treatment of step (b), either an optional granulation step (c) is carried out, or the pre-treated powder of step (b) is used for the forming step (d) without a granulation step. For further processing in step (c) or in step (d), either the pre-treated powder as obtained by the pre-treatment step (b) can be used, or the pre-treated powder after the washing step in which the water soluble boron compounds have been removed.

The boron nitride content of the pre-treated powder of step (b) which is used for further processing in optional step (c) or, if no granulation step (c) is carried out, for further processing in step (d), is selected in such a way that the boron nitride content of the formed body obtained in step (d) is at least 70% by volume, preferably of at least 80% by volume, based on the total volume of the formed body.

Additionally to hexagonal boron nitride and water soluble boron compounds, the pre-treated powder may contain other inorganic non-metallic components. For example, the pre-treated powder may contain mineral or ceramic powders, such as oxide ceramics, for example aluminum oxide ($Al_2O_3$), silicon oxide ($SiO_2$), and magnesium oxide (MgO), carbide ceramics, for example silicon carbide (SiC), and nitride ceramics, for example silicon nitride ($Si_3N_4$) and aluminum nitride (AlN), and mixtures thereof. The formed body can contain carbon (C) in amorphous or crystalline (graphite) modification. The mean particle size ($d_{50}$) of the mineral, ceramic or graphite powders is from 0.5 to 10 μm. The powders may typically have an irregular shape. The mineral, ceramic or carbon material can also be in the shape of spheres, fibers or flakes. The additional inorganic components can be added before and subsequent to the pre-treatment step of boron nitride. The pre-treated powder or powder mixture of step (b) is homogenized, for example in a blender, before the further processing in step (c).

The pre-treated powder of step (b) is further processed by optionally granulating the pre-treated powder in step (c). Preferably, a granulation step (c) is carried out after the pre-treatment step (b). By granulation, granulates or agglomerates are produced. The granulation can be carried out by various granulation methods, a dry granulation process is possible but also granulation processes known in the art such as spray drying or fluidized-bed drying. For dry granulation, a certain amount of water can be added, preferably in an amount of up to 15 wt.-%, more preferably up to 12 wt.-%, more preferably up to 8 wt.-%, more preferably up to 7 wt.-%. Most preferably, the amount of water added is from 0.5 to 7 wt.-%. A possible method for dry granulation is compacting the evenly mixed material with a roller compactor at least one time. For roller compaction, the pre-treated powder of step (b) is fed between two counter rotating rolls with a typical gap width of 400 to 1600 μm. Preferably, the pre-treated powder is fed continuously between the two counter rotating rolls. After roller compaction, the material is crushed and screened in order to obtain the granulated powder of step (c). This can be done by processing the material through screen breakers. The sieve width of the screen breakers may be for example from 0.5 to 5 mm. To generate an even more free-flowing granulate, the material can be forced through a sieve, for example with a sieve width of 200 μm, preferably followed by a sieving step to remove the fines, for example the fines below 50 μm. The fines can be recycled to the granulating step.

The granulated powder thus obtained in step (c) can be used for forming it into a shape in order to obtain the formed body of step (d). If no granulation step (c) is carried out, the pre-treated powder obtained in step (b) can be directly used for the forming step (d).

The bulk density of the granulated powder obtained in step (c) preferably is at least 0.5 g/cm$^3$, more preferably at least 0.6 g/cm³. In some embodiments, the bulk density is at least 0.7 g/cm³, or at least 0.8 g/cm³.

The specific surface area (BET) of the granulated powder is at least 12 m²/g, preferably at least 15 m²/g, more preferably at least 20 m²/g, more preferably at least 25 m²/g, more preferably at least 30 m²/g, and even more preferably at least 40 m²/g. In some embodiments, the specific surface area (BET) has values of at least 50 m²/g, or of at least 60 m²/g, or of at least 70 m²/g. In other embodiments, the specific surface area (BET) has values of at least 75 m²/g, or of at least 80 m²/g, or of at least 90 m²/g, or of at least 100 m²/g, or of at least 110 m²/g, or of at least 120 m²/g.

The graphitization index of the granulated powder obtained in step (c) preferably is at least 1, more preferably at least 1.5, more preferably at least 2, more preferably at least 2.5, more preferably at least 3, and even more preferably at least 4. The graphitization index is measured by powder X-ray diffraction, on samples obtained after the removal of the water soluble boron compounds by the washing step described above.

The moisture content of the granulated powder preferably is 8% by weight or less, based on the total weight of the granulated powder. Preferably, the moisture content of the granulated powder is at least 0.2% by weight, based on the total weight of the granulated powder. Typically, the moisture content of the granulated powder is from 1% to 7% by weight, based on the total weight of the granulated powder. The moisture content can be determined with a moisture balance, after keeping a sample at a temperature of 125° C. for 15 minutes.

The total content of water soluble boron compounds of the granulated powder typically is up to 20% by weight, the content of water soluble boron compounds being expressed as content of boric acid in percentage by weight, based on the total weight of the granulated powder. In some embodiments, the total content of water soluble boron compounds of the granulated powder is up to 10% by weight, or up to 6% by weight, the content of water soluble boron compounds being expressed as content of boric acid in percentage by weight, based on the total weight of the granulated powder. In some embodiments, the total content of water soluble boron compounds of the granulated powder is at least 0.5% by weight, the content of water soluble boron compounds being expressed as content of boric acid in percentage by weight, based on the total weight of the granulated powder. In some embodiments, the total content of water soluble boron compounds can be from 0.5 to 10% or from 0.5 to 6% by weight, the content of water soluble boron compounds being expressed as content of boric acid in percentage by weight, based on the total weight of the granulated powder.

The water soluble boron compounds present in the granulated powder are mainly oxygen containing boron compounds such as boric acid and ammonium borates. Examples of ammonium borates present in the granulated powder are ammonium pentaborate $(NH_4)B_5O_8$ or the hydrate thereof. Boric acid $(H_3BO_3)$ and the ammonium pentaborate $(NH_4)B_5O_8$ can be detected by X-ray diffraction measurements. The granulated powder preferably does not contain boron oxide $(B_2O_3)$ as boron oxide is preferably not added to the granulated powder, and it is not produced by the granulation step. This is confirmed by X-ray measurements that do not show the diffraction lines of boron oxide.

The water soluble boron compounds of the granulated powder can be removed by a washing step carried out at a temperature of 70-100° C. with hydrochloric acid, as described herein above. After the washing step, the granulated powder typically has a content of water soluble boron compounds of 0.5% or less, or of 0.3% or less by weight, based on the total weight of the granulated powder after the washing step. The specific surface area (BET) of the granulated powder after the washing step is preferably at least 15 m²/g, more preferably at least 20 m²/g, more preferably at least 25 m²/g, more preferably at least 30 m²/g, and even more preferably at least 40 m²/g. In some embodiments, the specific surface area (BET) has values of at least 50 m²/g, or of at least 60 m²/g, or of at least 70 m²/g. In other embodiments, the specific surface area (BET) has values of at least 75 m²/g, or of at least 80 m²/g, or of at least 90 m²/g, or of at least 100 m²/g, or of at least 110 m²/g, or of at least 120 m²/g.

The granulate size is preferably below 1000 µm, more preferably below 500 µm. In some embodiments, the granulate size is 200 µm and less. In some embodiments, the granulate size may be from 50 to 200 µm. The granulate size from 50 to 200 µm means a granulate powder that has been obtained by sieving, i.e. by removing the fines by sieving with a sieve width of 50 µm and by removing the coarse granulates by sieving with a sieve width of 200 µm.

The boron nitride content of the granulated powder obtained in step (c) is selected in such a way that the boron nitride content of the formed body obtained in step (d) is at least 70% by volume, preferably of at least 80% by volume, based on the total volume of the formed body.

Additionally to hexagonal boron nitride and water soluble boron compounds, the granulated powder may contain other inorganic non-metallic components. For example, the pre-treated powder may contain mineral or ceramic powders, such as oxide ceramics, for example aluminum oxide $(Al_2O_3)$, silicon oxide $(SiO_2)$, and magnesium oxide (MgO), carbide ceramics, for example silicon carbide (SiC), and nitride ceramics, for example silicon nitride $(Si_3N_4)$ and aluminum nitride (AlN), and mixtures thereof. The formed body can contain carbon (C) in amorphous or crystalline (graphite) modification. The mean particle size $(d_{50})$ of the mineral, ceramic or graphite powders is from 0.5 to 10 µm. The powders may typically have an irregular shape. The mineral, ceramic or carbon material can also be in the shape of spheres, fibers or flakes. Typically, the mean particle size $(d_{50})$ of the mineral or ceramic powders is from 0.5 to 10 µm.

In step (d), the granulated powder obtained in step (c) or the pre-treated powder obtained in step (b) is formed into a shape. Preferably, the granulated powder obtained in step (c) is formed into a shape. The forming is performed preferably by a pressing step, preferably by dry pressing, for example cold-isostatic pressing, or uniaxial pressing. The forming can be carried out at temperatures of up to 100° C. and is typically performed at temperatures from 10 to 40° C., preferably at room temperature (23° C.).

For the forming step (d), the addition of binders or pressing additives such as organic pressing additives, for example polyvinyl alcohol and polyethylene glycol, is not required. Preferably, for the forming step no pressing additives are used. Therefore, the pre-treated powder obtained in step (b), the granulated powder obtained in step (c) and the formed body obtained in step (d) preferably do not contain pressing additives, and preferably are free of organic additives.

The total content of water soluble boron compounds of the formed body typically is up to 20% by weight, the content of water soluble boron compounds being expressed as content of boric acid in percentage by weight, based on the total weight of the formed body. In some embodiments, the total content of water soluble boron compounds of the formed body is up to 10% by weight, or up to 6% by weight, the content of water soluble boron compounds being expressed as content of boric acid in percentage by weight, based on the total weight of the formed body. In some embodiments, the total content of water soluble boron compounds of the formed body is at least 0.5% by weight, the content of water soluble boron compounds being expressed as content of boric acid in percentage by weight, based on the total weight of the formed body. In some embodiments, the total content of water soluble boron compounds can be from 0.5 to 10% or from 0.5 to 6% by weight, the content of water soluble boron compounds being expressed as content of boric acid in percentage by weight, based on the total weight of the formed body powder.

The water soluble boron compounds present in the formed body are mainly oxygen containing boron compounds such as boric acid and ammonium borates. Examples of ammonium borates present in the formed body are ammonium pentaborate $(NH_4)B_5O_8$ or the hydrate thereof. Boric acid $(H_3BO_3)$ and the ammonium pentaborate $(NH_4)B_5O_8$ can be detected by X-ray diffraction measurements. The formed body preferably does not contain boron oxide $(B_2O_3)$ as boron oxide is preferably not added to the granulated powder used for the forming step, and it is not produced by the forming step. This is confirmed by X-ray measurements that do not show the diffraction lines of boron oxide.

If the optional granulation step (c) is performed, the forming process of step (d) is carried out with a low compaction factor. The compaction factor is defined by the ratio of the volume of the granulated powder before forming to the volume of the formed body after forming. The compaction factor can also be calculated by the ratio of the bulk density of the granulated powder before forming to the geometrical density of the formed body after forming. The low compaction factor observed in step (d) is unusual for boron nitride powders. The compaction factor for commercially available boron nitride powders typically is more than 5 or more than 10, for formed bodies with a density of 70% to 80% of theoretical density. The compaction factor for the pre-treated and granulated powder of step (c) is typically at most 5, preferably at most 3, more preferably at most 2.7, more preferably at most 2.5. In some embodiments, the compaction factor for the pre-treated and granulated powder of step (c) is at most 2.2, or at most 2.0, or at most 1.8. The compaction factor can be determined with a forming pressure of 1200 bar or 17405 psi, for formed bodies with a density of 70% to 80% of theoretical density.

A low compaction factor for the powder used for the forming step is useful because this results in shorter cycle times for pressing, and the venting of the pressing mold is improved. The pressing can be performed with commercially available pressing equipment. Small-volume components can be produced with high-speed presses with an output rate of more than 100 pieces per minute.

After forming, the formed hexagonal boron nitride body can be mechanically machined. It is also possible to have a near net shape forming process, i.e. the formed body can be obtained directly by the forming step without the need of further mechanically machining.

The formed hexagonal boron nitride body can be used for electrically isolating parts, for example electrically isolating parts for furnace manufacturing or electrically isolating parts for high temperature applications. These electrically isolating parts have the advantage of being free of organic additives. The formed hexagonal boron nitride body can also be used as sealing component for sensors and heating cartridges and for automotive components such as engine components or exhaust gas components.

The invention will be described in more detail by the following examples.

EXAMPLES

Example 1 (EX1)

A commercially available high purity hexagonal boron nitride powder (3M™ Boron Nitride Powder Grade S1) with a specific surface area of 13 m²/g, a mean particle size ($d_{50}$) of 3 μm, a graphitization index of 3.7 and a content of water-soluble boron compounds of not more than 0.08% by weight is used as starting powder. The pre-treatment of this powder is carried out as described in the following. The starting powder is filled into a vibration mill (Vibratom Typ 125, Siebtechnik GmbH, Malheim, Germany), together with hard metal milling-balls with an average diameter of 10 mm. The container of the vibration mill is filled up to ⅔ with milling balls, and about 20-40 kg of starting powder are added. The vibration mill is run for 45 minutes with the starting powder and the milling balls. After this pre-treatment, the specific surface area has reached 45 m²/g and the content of water-soluble boron compounds of the hexagonal boron nitride powder has increased up to a value of 1.3% by weight (see table 1).

Following the pre-treatment, the pre-treated powder is prepared for granulation by homogeneously mixing with 7 wt.-% of deionized water in a mixing device (Eirich mixer) for 10 minutes at 1200 rpm. The granulation is carried out as a dry granulation with a roller compactor (RC 100 PHARMA from Powtec, Remscheid, Germany). For roller compaction, the mixture of the pre-treated powder with deionized water is continuously fed between two counter rotating structured rolls. The rolls are structured with 1.2 mm deep axial rounded grooves distributed along the circumference of the rolls with a distance of about 10 mm to each other. The two counter rotating rolls have a gap width of 400-1600 μm and are pressed with a pressure of about 150 bar against each other while rotating with 10 rpm. The roller-compacted material is processed through screenbreakers with a mesh width of 1000 μm (80 rpm). Those two steps are repeated 5 times. To generate an even better free flowing granulate, the material is forced through a sieve with a sieve width of 200 μm. The fines below 50 μm are removed by sieving. The fines are recycled and re-used for the granulating step. The so produced granules have a remaining water-content of 5.07% by weight and a bulk density of 0.81 g/cm³ (see table 1).

The granules are uniaxial dry-pressed into a 20×20 mm mould with a force of 50 kN. The compaction factor is 1.99. The obtained formed body with the dimensions 20×20×10 mm shows a geometrically calculated density of 1.60 g/cm³. The formed body has a compressive strength of 6.8 MPa and a hardness of 2.7 HBW 2.5/2 (see table 1) and is good to handle with respect to the stability of edges. Furthermore, the porositiy (median pore diameter) of the formed body is measured using mercury porosimetry according to ISO 15901 (see table 1).

Example 2 (EX2)

For Example 2, Example 1 is repeated, with the same starting powder and processing, with the exception that the pre-treatment of the powder is carried out for 90 minutes.

The results for Example 2 are shown in table 1. The graphitization index of the pre-treated powder and of the granulated powder is 4.4.

Example 3 (EX3)

For Example 3, Example 1 is repeated, with the same starting powder and processing, with the exception that the pre-treatment of the powder is carried out for 180 minutes. The results for Example 3 are shown in table 1. The graphitization index of the pre-treated powder and of the granulated powder is 4.4.

Example 4 (EX4)

For Example 4, Example 1 is repeated, with the exception that a different starting powder is used. Starting powder is a commercially available high purity hexagonal boron nitride powder (3M™ Boron Nitride Powder Grade S15) with a specific surface area of 3.2 $m^2/g$, a mean particle size ($d_{50}$) of 15 µm and a content of water-soluble boron compounds of not more than 0.05% by weight. The processing of Example 4 is the same as for Example 1. The results for Example 4 are shown in table 1.

Example 5 (EX5)

For Example 5, Example 4 is repeated, with the exception that the pre-treatment of the powder is carried out for 180 minutes. The results for Example 5 are shown in table 1.

Example 6 (EX6)

For Example 6, Example 4 is repeated, with the same starting powder and processing, with the exception that the pre-treatment is carried out differently. For the pre-treatment, about 4 kg of starting powder are put into a 60 liter barrel with a diameter of about 35 cm together with 16 kg of $Al_2O_3$ milling balls of an average diameter of 20 mm. The barrel is closed airtight and put on a barrel mixer. The barrel is turned for 4 days with a rotational speed of 60 rpm. Within these 4 days the specific surface area increases from 3.2 $m^2/g$ to 31 $m^2/g$ after 24 h, to 46 $m^2/g$ after 48 h, to 66 $m^2/g$ after 72 h and to 85 $m^2/g$ after 96 h. The content of water-soluble boron compounds (expressed as $H_3BO_3$ content) also increases, from initially below 0.09 wt.-% to 2.8 wt.-% after 24 h, to 4.8 wt.-% after 48 h, to 6.8 wt.-% after 72 h and to 7.6 wt.-% after 96 h. The pre-treated material thus obtained after 4 days is aged under artificial climatic conditions (29° C.; 70% relative humidity) for 40 days. After the 40 days, the specific surface area drops down from 85 $m^2/g$ to 12 $m^2/g$. The aged material is used for the further processing of granulation and dry-pressing as described for Example 1. The results for Example 6 are shown in table 1. The graphitization index of the aged material and of the aged material after granulation is 1.5. After aging the material for 40 days, a washing step with hydrochloric acid to remove the water soluble boron compounds is performed as described herein above. After the washing step, the specific surface area is 30 $m^2/g$. Samples of formed bodies produced from material after 24 to 96 h of the pre-treatment, before performing the aging process described above, with the processing of granulation and dry-pressing performed as described for Example 1, show increasing compressive strength along with rising time of pre-treatment (22.7 MPa after 24 h; 24.8 MPa after 48 h; 26 MPa after 72 h; 26.9 MPa after 96 h).

Example 7 (EX7)

For Example 7, Example 1 is repeated, with the exception that a different starting powder is used and a different duration of the pre-treatment is used. A hexagonal boron nitride powder (3M™ Boron Nitride Powder Grade SOX) with a specific surface area of 11.9 $m^2/g$, a mean particle size ($d_{50}$) of 3 µm and a content of water-soluble boron compounds of 1.9% by weight is used as starting powder. Pre-treatment and processing of Example 7 is the same as for Example 1 except for the duration of the pre-treatment, which is performed until the specific surface area reaches a value of 17.8 $m^2/g$. The results for Example 7 are shown in table 1.

Example 8 (EX8)

For Example 8, Example 7 is repeated, with the same starting powder and processing, with the exception that the mixing step after pre-treatment and before granulation is carried out differently. In addition to 7 wt.-% of deionized water, the pre-treated hexagonal boron nitride powder is mixed with 10 wt.-% alumina (CT3000, Almatis GmbH, Frankfurt, Germany), based on the total weight of the pre-treated powder mixed with deionized water and alumina. The results for Example 8 are shown in table 1.

Example 9 (EX9)

For Example 9, Example 7 is repeated, with the same starting powder and processing, with the exception that the mixing step after the pre-treatment and before granulation is carried out differently. In addition to 7 wt.-% of deionized water, the pre-treated hexagonal boron nitride powder is mixed with 20 wt.-% alumina (CT3000, Almatis GmbH, Frankfurt, Germany), based on the total weight of the pre-treated powder mixed with deionized water and alumina. The results for Example 9 are shown in table 1.

Example 10 (EX10)

For Example 10, Example 2 is repeated, with the exception that the pre-treated powder is aged under ambient conditions in a barrel closed airtight for 60 days. After the 60 days, the pre-treated powder and aged powder is used for further processing. The further processing of granulation and dry-pressing is performed as described for Example 2. The results for Example 10 are shown in table 1.

Example 11 (EX11)

For Example 11, Example 10 is repeated, with the exception that for the pre-treated and aged powder a washing step is carried out with hydrochloric acid as described herein above. After the washing step, the powder is used for further processing of granulation and dry-pressing as described for Example 2. The results for Example 10 are shown in table 1.

Comparative Example 1 (CEX1)

A hexagonal boron nitride powder (3M™ Boron Nitride Powder Grade S1X) with a specific surface area of 9.8 $m^2/g$ and a content of water-soluble boron compounds of 2.6% by weight is uniaxially dry-pressed into a 20×20 mm mould with a force of 50 kN. The compaction factor is 6.9. The obtained formed body with the dimension 20×20×10 mm has a geometrically calculated density of 1.04 g/cm³. The formed body has a compressive strength of 1.7 MPa and a hardness of 0.6 HBW 2,5/2 (see table 1). The formed body is powdry and soft and mechanically not stable. Furthermore, the porosity (median pore diameter) of the formed body is measured using mercury porosimetry according to ISO 15901 (see table 1).

Comparative Example 2 (CEX2)

A formed body was produced according to EP 0 939 066 A1, Example 1. A hexagonal boron nitride powder was prepared as described in Example 1 with properties as shown in table 2 column 3. The surface area of the prepared powder was 2.8 m²/g (instead of 2.51 m²/g as in table 2 column 3). The powder was compacted, granulated and again compacted following the description of EP 0 939 066 A1, Example 1. The so obtained formed body had final density of 1.91 g/cm³, thus the same value for the density as described in EP 0 939 066 A1, Example 1, was reached. The compressive strength of the formed body is 1.7 MPa and the hardness is 1.3 HBW 2,5/2 (see table 1). The formed body is powdry and soft and mechanically not stable. Furthermore, the porosity (median pore diameter) of the formed body is measured using mercury porosimetry according to ISO 15901 (see table 1).

Comparative Example 3 (CEX3)

For comparative Example 3, Example 4 is repeated, with the exception that no pre-treatment step is performed. Starting powder is a commercially available high purity hexagonal boron nitride powder (3M™ Boron Nitride Powder Grade S15) with a specific surface area of 3.2 m²/g, a mean particle size ($d_{50}$) of 15 µm and a content of water-soluble boron compounds of not more than 0.05% by weight. The graphitization index is 1.4. The processing of Comparative Example 3 is the same as for Example 1 with the exception that no pre-treatment has been carried out. The results for Comparative Example 3 are shown in table 1. As a granulation step has been carried out, the compaction factor is below 5. The obtained formed body is powdry and soft and mechanically not stable.

Exemplary embodiments include the following:

Embodiment 1

A formed body comprising hexagonal boron nitride wherein the formed body has a Brinell hardness of at least 2 HBW 2.5/2, and wherein the formed body is obtainable by a process at temperatures of at most 100° C., and wherein the Brinell hardness is measured according to DIN EN ISO 6506-1 (2013).

Embodiment 2

The formed body of embodiment 1, wherein the formed body has a compressive strength of at least 3 N/mm², preferably at least 5 N/mm², more preferably at least 7 N/mm², more preferably at least 10 N/mm², more preferably at least 12 N/mm², and wherein the compressive strength is measured as maximum force before rupture of a test sample of the formed body, divided by the area of the test sample on which the load is applied.

Embodiment 3

The formed body of embodiment 1 or 2, wherein the formed body has a relative density of at least 50%, preferably of at least 60%, more preferably of at least 70%, of the theoretical density of the formed body.

Embodiment 4

The formed body of any one of embodiments 1 to 3, wherein the formed body has a boron nitride content of at least 70% by volume, preferably at least 80% by volume, based on the total volume of the formed body.

Embodiment 5

The formed body of any one of embodiments 1 to 4, wherein the formed body has a Brinell hardness of at least 3 HBW 2.5/2, preferably of at least 5 HBW 2.5/2, measured according to DIN EN ISO 6506-1 (2013).

Embodiment 6

The formed body of any one of embodiments 1 to 5, wherein the formed body does not contain pressing additives.

Embodiment 7

The formed body of any one of embodiments 1 to 6, wherein the formed body comprises less than 50% by volume, preferably less than 20% by volume, more preferably 0% by volume, based on the total volume of the formed body, of a powder that has been obtained by milling or machining of hot-pressed hexagonal boron nitride sintered parts.

Embodiment 8

The formed body of any one of embodiments 1 to 7, wherein the formed body comprises water soluble boron compounds in an amount of up to 20% by weight, and wherein the content of water soluble boron compounds is expressed as content of boric acid in percentage by weight, based on the total weight of the formed body, and wherein the water soluble boron compounds comprise boric acid and ammonium borates, and wherein the water soluble boron compounds do not comprise boron oxide.

Embodiment 9

A granulated powder for making the formed body according to embodiment 1, wherein the granulated powder comprises hexagonal boron nitride and wherein the granulated powder has a bulk density of at least 0.5 g/cm³, a specific surface area (BET) of at least 12 m²/g and a specific surface area (BET) of at least 15 m²/g after a washing step, wherein the washing step is carried out at a temperature of 70-100° C. with hydrochloric acid.

Embodiment 10

A process for making the granulated powder according to embodiment 9, wherein the process comprises the steps (a) providing a powder comprising hexagonal boron nitride powder;

(b) mechanically pre-treating the powder of step (a) to obtain a pre-treated powder; and (c) granulating the pre-treated powder of step (b) in order to obtain a granulated powder; and wherein all process steps for making the granulated powder are carried out at temperatures of at most 100° C.

Embodiment 11

The process of embodiment 10, wherein the mechanical pre-treatment of step (b) is a dry milling process.

Embodiment 12

The process of embodiment 10 or 11, wherein the specific surface area (BET) of the pre-treated powder obtained in step (b) increases by the pre-treatment of step (b) by a factor of at least 1.5 times, preferably at least 2, more preferably at least 5, most preferably at least 10 times of the specific surface area (BET) of the starting material provided in step (a).

Embodiment 13

A process for making the formed body according to embodiment 1, wherein the process comprises the steps (a) providing a powder comprising hexagonal boron nitride powder;

(b) mechanically pre-treating the powder of step (a) to obtain a pre-treated powder;

(c) optionally granulating the pre-treated powder of step (b) in order to obtain a granulated powder; and (d) forming the pre-treated powder of step (b) or the granulated powder of step (c) into a shape in order to obtain a formed body;

and wherein all process steps for making the formed body are carried out at temperatures of at most 100° C.

Embodiment 14

The process of embodiment 13, wherein the pre-treated powder of step (b) is granulated in order to obtain the granulated powder of step (c), and wherein the forming of step (d) is carried out with a compaction factor of at most 5, preferably of at most 3, more preferably of at most 2.7, most preferably of at most 2.5.

Embodiment 15

The use of the formed body of embodiment 1 for electrically isolating parts, for sealing components for sensors and heating cartridges, and for automotive components.

TABLE 1

| | Powder after pre-treatment | | Granulated powder | | | Formed body (dry-pressed samples, 1200 bar = 17404.8 psi) | | | | | | |
|---|---|---|---|---|---|---|---|---|---|---|---|---|
| Example No. | Content of water soluble boron compounds* [wt.-%] | specific surface area [m²/g] | moisture content [wt.-%] | granulate size** [μm] | bulk density [g/cm³] | density of formed body**** [g/cm³] | density of formed body***** [g/cm³] | relative density [%] | compaction factor | compressive strength [MPa] | Brinell hardness [HBW 2.5/2] | median pore diameter (volume), Hg porosimetry [nm] |
| EX1 | 2.4 | 45.0 | 5.1 | 50-200 | 0.81 | 1.69 | 1.60 | 71.3 | 2.0 | 6.8 | 2.7 | 28.0 |
| EX2 | 5.0 | 79.0 | 4.7 | 50-200 | 0.95 | 1.86 | 1.77 | 78.7 | 1.9 | 14.9 | 8.6 | 15.0 |
| EX3 | 9.0 | 123.0 | 3.6 | 50-200 | 1.03 | 1.81 | 1.75 | 77.6 | 1.7 | 14.5 | 8.6 | 14.4 |
| EX4 | 1.7 | 20.0 | 4.2 | 50-200 | 0.76 | 1.91 | 1.83 | 81.2 | 2.4 | 5.1 | 3.2 | 70.0 |
| EX5 | 8.8 | 115.0 | 3.9 | 50-200 | 0.93 | 1.84 | 1.76 | 78.4 | 1.9 | 13.5 | 8.8 | 19.4 |
| EX6 | 5.7 | 12.0 | 6.1 | 50-200 | 0.83 | 1.96 | 1.84 | 81.6 | 2.2 | 29.7 | 12.1 | n.d. |
| EX7 | 6.1 | 17.8 | 5.3 | 50-200 | 0.82 | 1.77 | 1.76 | 78.2 | 2.1 | 7.4 | 3.2 | n.d. |
| EX8 | 6.1 | 17.8 | 5.1 | 50-200 | 0.79 | 1.82 | 1.82 | 73.4 | 2.3 | 7.2 | 2.5 | n.d. |
| EX9 | 6.1 | 17.8 | 4.8 | 50-200 | 0.79 | 1.86 | 1.86 | 71.9 | 2.3 | 7.9 | 2.5 | n.d. |
| B10 | 5.9 | 64.1 | 3.0 | 50-200 | 0.88 | 1.78 | 1.78 | 79.1 | 2.0 | 15.4 | n.d. | n.d. |
| B11 | 1.0 | 64.7 | 3.8 | 50-200 | 0.84 | 1.70 | 1.70 | 75.3 | 2.0 | 10.6 | n.d. | n.d. |
| CEX1 | 2.6 | 9.8 | 0.1 | n.a. | 0.15 | 1.04 | 1.04 | 46.2 | 6.9 | 1.7 | 0.6 | 142.5 |
| CEX2 | 0.2 | 2.8 | 0.3 | *** | n.a. | 1.91 | 1.91 | 84.9 | n.a. | 1.7 | 1.3 | 148.6 |
| CEX3 | 0.09 | 3.4 | 2.7 | 50-200 | 0.43 | 1.89 | 1.84 | 81.8 | 4.3 | 2.7 | 1.2 | n.d. |

*expressed as content of $H_3BO_3$,
**fines are removed with a sieve width of 50 μm, coarse granulates are removed with a sieve width of 200 μm,
*** according to EP 0 939 066 A1,
****based on total weight (including $H_2O$),
*****based on solid content (excluding $H_2O$),
n.a. = not applicable,
n.d. = not determined

The invention claimed is:

1. A formed body comprising hexagonal boron nitride wherein the formed body has a Brinell hardness of at least 2 HBW 2.5/2, and wherein the formed body is obtained by a process at temperatures of at most 100° C., and wherein the Brinell hardness is measured according to DIN EN ISO 6506-1 (2013).

2. The formed body of claim 1, wherein the formed body has a compressive strength of at least 3 N/mm², wherein the compressive strength is measured as maximum force before rupture of a test sample of the formed body, divided by the area of the test sample on which the load is applied.

3. The formed body of claim 1, wherein the formed body has a relative density of at least 50% of the theoretical density of the formed body.

4. The formed body of claim 1, wherein the formed body has a boron nitride content of at least 70% by volume based on the total volume of the formed body.

5. The formed body of claim 1, wherein the formed body has a Brinell hardness of at least 3 HBW 2.5/2, measured according to DIN EN ISO 6506-1 (2013).

6. The formed body of claim 1, wherein the formed body does not contain pressing additives.

7. The formed body of claim 1, wherein the formed body comprises less than 20% by volume based on the total volume of the formed body, of a powder that has been obtained by milling or machining of hot-pressed hexagonal boron nitride sintered parts.

8. The formed body of claim 1, wherein the formed body comprises water soluble boron compounds in an amount of up to 20% by weight, and wherein the content of water soluble boron compounds is expressed as content of boric acid in percentage by weight, based on the total weight of the formed body, and wherein the water soluble boron compounds comprise boric acid and ammonium borates, and wherein the water soluble boron compounds do not comprise boron oxide.

9. A process for making the formed body according to claim 1, wherein the process comprises the steps
   (a) providing a powder comprising hexagonal boron nitride powder;
   (b) mechanically pre-treating the powder of step (a) to obtain a pre-treated powder having a specific surface area (BET) of at least 12 m²/g;
   (d) forming the pre-treated powder of step (b) into a shape in order to obtain a formed body;
   and wherein all process steps for making the formed body are carried out at temperatures of at most 100° C.

10. The process of claim 9, wherein the pre-treated powder of step (b) is granulated in order to obtain a granulated powder, and wherein the forming of step (d) is carried out with the granulated powder at a compaction factor of at most 5.

11. The formed body of claim 1, wherein the formed body has a compressive strength of at least 12 N/mm², wherein the compressive strength is measured as maximum force before rupture of a test sample of the formed body, divided by the area of the test sample on which the load is applied.

12. The formed body of claim 1, wherein the formed body has a relative density of at least 70% of the theoretical density of the formed body.

13. The formed body of claim 1, wherein the formed body has a boron nitride content of at least 80% by volume based on the total volume of the formed body.

14. The formed body of claim 1, wherein the formed body has a Brinell hardness of at least 5 HBW 2.5/2, measured according to DIN EN ISO 6506-1 (2013).

15. The formed body of claim 1, wherein the formed body is obtained from hexagonal boron nitride powder having a specific surface area (BET) of at least 12 m²/g.

* * * * *

UNITED STATES PATENT AND TRADEMARK OFFICE
CERTIFICATE OF CORRECTION

| | |
|---|---|
| PATENT NO. | : 10,829,417 B2 |
| APPLICATION NO. | : 16/310230 |
| DATED | : November 10, 2020 |
| INVENTOR(S) | : Krishna Uibel |

Page 1 of 1

It is certified that error appears in the above-identified patent and that said Letters Patent is hereby corrected as shown below:

In the Claims

Column 21
Line 20, Claim 9, after "12 m$^2$/g;" insert -- and --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*